Oct. 23, 1951         J. H. McCOY         2,572,741
STOCK-BAR FEED FOR MACHINE TOOLS
Filed Jan. 8, 1948
Fig. 1.
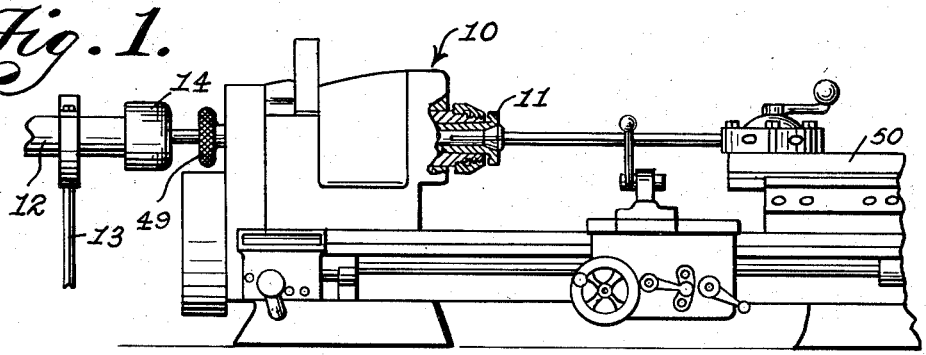
Fig. 2.
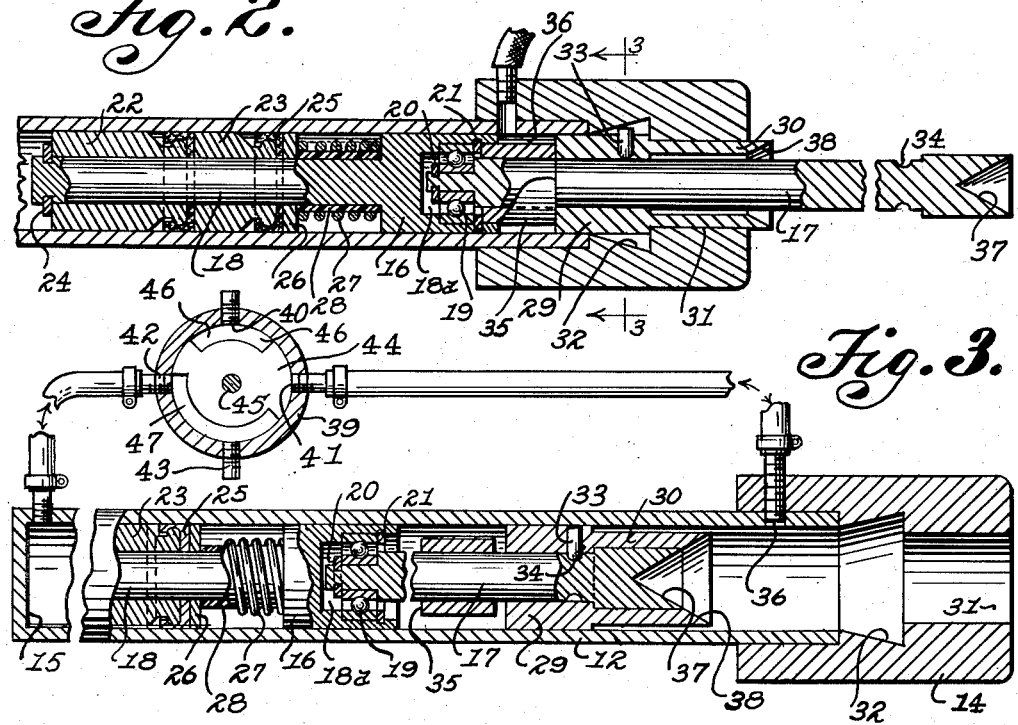
Fig. 3.
Fig. 4.
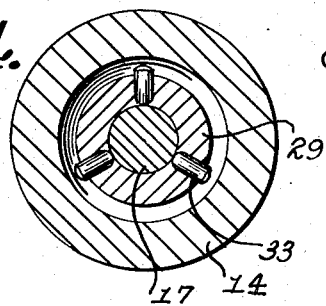
Fig. 5.
INVENTOR.
James H. McCoy
BY Francis G. Boswell
ATTORNEYS Patented Oct. 23, 1951

2,572,741

UNITED STATES PATENT OFFICE 2,572,741

STOCK-BAR FEED FOR MACHINE TOOLS

James H. McCoy, Chicago, Ill., assignor to O K Specialty Co., Inc., a corporation of Illinois Application January 8, 1948, Serial No. 1,109

6 Claims. (Cl. 29—59)

The object of the invention is to provide means for feeding bar stock into the spindles of machine-tools, so that parts to be made from such bars may be fully machined before being severed from the bars and the bars, after severance of the machined parts, quickly and accurately positioned for repeat of the previous operations; to provide a feeding means for the purpose indicated which will admit of the use of a low-pressure pneumatic feed and have a stock-bar capacity for bars of all diameters from the smallest to the largest which the machine-tool spindle will receive; to provide a stock-bar feed in which the feeding member is maintained centrally in the feed-tube during the feeding operations but is susceptible of being projected into the machine-tool spindle to position in the latter the last remaining part of the stock-bar available for use; to provide, in such feeding means, an appliance through the instrumentality of which the feed member may be quickly withdrawn from the machine-tool spindle; and generally to provide apparatus for the purpose specified which is of simple form, susceptible of cheap manufacture and of a character that will withstand hard usage without likelihood of failure.

With the above object in view, the invention consists in a construction and combination of parts of which a preferred embodiment is illustrated in the accompanying drawings in which:

Figure 1 is an elevational view of a conventional turret lathe showing generally the application of the invention to such tools;

Figure 2 is a longitudinal diametrical sectional view of the forward or discharge end of the feed tube, showing therein the piston and the feed plunger, the latter projected, as when it enters the machine-tool spindle;

Figure 3 is a view similar to that of Figure 2, but with the feed plunger within the feed tube;

Figure 4 is a sectional view in the plane indicated by the line 4—4 of Figure 2; and Figure 5 is an edge view of one of the detachable collars used in connecting the two parts of the feed plunger and in locking one of those parts to the piston.

Designed for feeding bar stock to a machine tool, as for example, the turret lathe 10, the invention is positioned at the rear end of the live spindle 11 thereof with its feed tube 12 arranged in axial continuation of the spindle. The tube 12 is of considerable length, in the present instance about sixteen feet, so that it may receive, in addition to the ejecting apparatus, full-length stock-bars with which it is charged as hereinafter explained.

The forward end of the feed tube is spaced from the rear end of the spindle (as it must be shifted for charging) and is supported on adjustable standards, such as that indicated at 13, for the purpose of ready alignment with the spindle.

Since the stock-bar is ejected from the feed tube, it is open at its forward end and thereat it is embraced by a nose member 14, the function of which hereinafter appears. At the rear end, the feed tube is closed, as shown at 15 in Figure 3, air under pressure being admitted at this end for the operation of the ejecting apparatus. Primarily the ejecting apparatus is intended to be operated at low pressure and the tube, therefore, is designed to be of materially greater cross-sectional area than that of the stock-bars it is to receive. With low unit pressure on a large area, as effective moving force is obtained as with high unit pressure on a small area, as would be the case were the interior diameter of the tube reduced to that of the stock-bar. With low pressure the hazards of failures likely with high pressure are avoided.

The ejecting apparatus embodies a plunger which is composed of a body 16 of substantially the diameter of the bore of the tube, a shaft 17 of materially less diameter than that of the body portion and extending forwardly of the latter, and a stem 18 integral with the body portion and extending rearwardly from the same. The body portion, on its forward end, is bored, as indicated at 18a, to provide a chamber in which the ball-bearing 19 is housed, this ball-bearing constituting the rear support for the shaft 17 and providing for its rotation independently of the body portion.

Split collars 20 and 21, of the character illustrated in Figure 5, serve to secure the ball-bearing in its chamber and to the shaft 17, the former being counterbored to provide an abutment shoulder for the bearing and the latter having its rear end reduced for a similar purpose. The collar 20 is sprung over the reduced portion of the shaft and seats in an exterior groove therein while the collar 21 is sprung into an interior groove in the chamber. The two collars and the shoulders thus serve to fix the ball-bearing both with respect to the body portion and to the shaft, permitting relative angular or turning movement of the two but precluding relative axial movement of the same.

The impelling means for the plunger is a piston composed of the tandem sections 22 and 23 through which the stem 18 extends and with respect to which they are slidable. A split collar 24, similar to collar 20 and similarly attached, is carried by the stem at its rear end and normally abuts the rear face of the section 22. Both sections of the pistons are necked at their forward ends to provide heads which are covered on the forward faces and peripherally by packing washers 25 (preferably leather) which bear against the feed tube wall to insure against air leakage, since the piston is air-actuated, as before stated. The forward section of the piston bears against the packing washer of the rear section and a plate washer 26 bears against the packing washer of the forward section, acting as a thrust plate for the compression spring 27 which surrounds the stem and bears, at its forward end, on the body portion of the plunger. In order to reduce to a minimum air leakage around the stem, the latter is surrounded, within the spring, with a closely fitting elastic sleeve 28 which is under at least some longitudinal compression when the body portion of the plunger is as far removed from the piston as it may be, which is when the washer 24 abuts the rear face of the piston.

The sliding connection between the plunger and the piston provides for relative movement of the two which is resisted by the compression spring the function of which is that of a snubber to compensate for the rebound of the stock-bar when it strikes the machine tool stop in the feeding operations.

Since the plunger shaft 17 is of materially less diameter than that of the bore of the feed tube, some supporting means must be provided for its forward end to maintain it in axial coincidence with the tube; and since the shaft is projected from the tube into the machine tool spindle to feed thereinto the last section of the stock, such supporting must be releasable to permit such projection. This supporting means is a traveler 29 of generally tubular form whose exterior diameter approximates that of the bore of the tube, so that it may both slide and turn therein, and whose interior diameter is such as to form a bearing for the shaft, in order that the latter may rotate in the traveler. The forward end of the traveler is reduced in diameter to form a pilot portion 30 which, at the discharge end of the feed tube, enters the bore 31 of the nose member 14, the diameter of the bore being such as to form a freely sliding fit for the pilot 30. The bore 31 is undercut, as shown at 32, so as to define the slant surface of a conical frustum whose smaller base is the same diameter as that of the bore of the feed tube and is remote from the bore 31.

When the traveler is wholly within the feed tube, it is locked to the shaft 17 in such a way as to preclude relative axial movement of the two while permitting relative angular or turning movement. As illustrated, this is accomplished by means of radial pins 33 slidably mounted in radial holes in the traveler and seating, at their inner ends, in a circumferential groove 34 on the shaft 17. The pins are terminally rounded at both ends and are of such length that, when they are seated in the groove and the traveler is within the tube, they bear at their outer ends on the inner wall of the tube. Thus as such time the traveler is locked to the shaft but the latter is free to rotate in it. However, when in operation of the plunger, the traveler is advanced to the nose member, the pilot of the former enters the bore 31, moving axially therein until the shoulder at the junction of the traveler with its pilot engages the shoulder formed where the bore 31 is undercut. Then the pins are in the region of the undercut recess and may be moved radially out of locking engagement with the shaft 17, the camming action of the cross-sectionally arcuate groove 34 on the rounded ends of the pins effecting this.

Released from the traveler, the plunger shaft may enter the machine tool spindle, being limited in this movement by the spacer sleeve 35 loosely mounted on the shaft between the traveler and the ball-bearing. When the two ends of the sleeve abut respectively the traveler and the collar 21, further relative movement of the shaft and traveler in the stock-bar ejecting direction is precluded. But in the spacing function position of the sleeve 35, the latter is in the region of the air port 36 through which air under pressure may be admitted to the space surrounding the sleeve. The purpose of this is to withdraw the shaft from the spindle; and the function is accomplished by the pressure acting on the body portion of the plunger (since this is the only part susceptible of response to such pressure in the recited positions of the several parts) forcing it back and causing it to apply a pull on the shaft. The bore in the pilot 30 exceeds in diameter the bore in the body of the traveler and so forming the two bores results in an interior shoulder at the juncture of the pilot with the traveler. A complemental shoulder is formed on the shaft 17 by making its forward end of greater diameter than the remainder of the shaft but of such a diameter as to fit snugly but freely in the pilot. In the shaft withdrawing operation, the traveler remains stationary (the pins 33 engaging the wall of the recess 32 insuring this) until the shoulders in the pilot and on the shaft abut. At such instant the groove 34 is in position to receive the pins which are forced into the groove by the camming action of the inclined wall of the recess 32. After engagement of the pilot and shaft shoulders, no further movement is possible but at that time the shaft is fully withdrawn from the spindle and the feed tube is ready for recharging with a new stock-bar.

In the recharging operation, the feed tube is shifted laterally at its forward end to a position where it will be unobstructed by the head-stock of the lathe. The standards supporting the tube are so constructed as to provide for this, the rear standard having a pivotal mounting for the tube and the forward standard having dual seats for the same of which one aligns the tube with the machine tool spindle and the other supports its forward end laterally of the head-stock. Prior to recharging, the rear end of the tube is vented to the atmosphere. Then a new stock-bar is placed against the forward end of the plunger shaft and forced back into the tube, the plunger and piston being moved back ahead of it.

A conical seat 37 is formed in the forward end of the plunger shaft and a frusto-conical seat 38 in the corresponding end of the pilot 30, the latter seat being so dimensioned as to form a continuation of the former when the complemental shoulders on the shaft and pilot abut. The rear end of the stock-bar is engaged in the seat 37 in the operation of the plunger and the seat 38 functions to direct it into the same.

After recharging with a new stock-bar, the feed tube is shifted back into alignment with the spindle preparatory to carrying out operations to fabricate new parts.

Any conventional control for air under pressure will suffice for actuating the invention, but, for economy of the operator's time, that control should be accessible from his position at the machine tool and may well be a multiple port valve 39 of which the ports 40, 41 and 42 are connected by tubular conductors respectively to a source of air under pressure, to the port 36 of the feed tube and to the port at the closed end of the feed tube, the port 43 constituting an exhaust port. The several ports are controlled by a plug 44 carried on a stem 45 by means of which the plug may be turned by a handle (not shown). Sectors are removed from the periphery of the plug so as to leave channels 46 and 47, the former of which may be selectively placed in bridging relation either with the ports 40 and 41 or with the ports 40 and 42. In the first position pneumatic pressure will be admitted to the tube through the port 36 to retract the plunger from the spindle, and in the second position pneumatic pressure will be admitted to the tube behind the piston to advance the same and with it the plunger and the stock-bar. The plug is susceptible of a third position with the channel 46 intermediate between the ports 41 and 42, thus excluding pressure entirely from the feed tube.

The channel 47 is so positioned that it bridges the ports 42 and 43 in the pressure excluding position of the plug and thus vents the rear end of the feed tube to the atmosphere, so that there will be no back pressure in the charging operation. And this channel is of sufficient angular extent to retain this bridging relation of ports 42 and 43 when the channel 46 bridges the ports 40 and 41 and thus provides for dissipating back pressure on the plunger during withdrawal of the plunger shaft from the spindle.

The stock-bar feeding operation is periodic, that is, as each part of the bar is machined and severed, the feed is actuated to move the bar forward for a new operation after release of the collet 48 by means of its hand-piece 49. The feeding movement of the bar continues until the bar engages the stop on the turret or other means carried by the tail-stock 50 which has been set to give the proper length of stock to be machined. Since the feed is comparatively fast, impact of the stock-bar with the stop will result in a rebound which is promptly compensated for by the recoil of the snubber spring 27, thus insuring the bar being firmly against the stop when the collet is tightened for a machining operation.

The invention having been fully described, what is claimed as new and useful is:

1. In combination with the live spindle of a machine tool, a stock-bar feed comprising a feed tube arranged in axial continuation of the spindle, a pneumatically impelled plunger within the tube behind a stock-bar therein contained, the exterior diameter of the plunger being less than the diameter of the bore of the spindle, so that, in the feeding operations, the former may enter the latter, a member slidable within the tube and locked to the forward end of the plunger to support the latter centrally within the tube, cooperative means on said member and tube for automatically effecting release of the member from the plunger and permit relative sliding movement of the two when the plunger reaches the discharge end of the tube, means which define an air chamber behind said member in its released position, and means for admitting air under pressure into said chamber to effect retrograde movement of said plunger.

2. In combination with the live spindle of a machine tool, a feed tube arranged in axial continuation of the spindle, a piston movable in the tube, a stock-bar ejecting plunger operatively connected with the piston, a traveler slidable axially and angularly in the tube and embracing the forward end of the plunger, locking means securing the traveler to the plunger to prevent relative axial movement of the two, cooperating means on the tube and traveler for releasing the latter from the plunger, so that, at the discharge end of the tube, the plunger may be projected into the spindle, means which define an air space behind said traveler in its released position, and means for admitting air under pressure into said space to effect retrograde movement of said plunger.

3. In combination with the live spindle of a machine tool, a feed tube arranged in axial continuation of the spindle, a piston movable in the tube, a stock-bar ejecting plunger operatively connected with the piston, a traveler slidable axially and angularly in the tube and embracing the forward end of the plunger, radial pins carried by the traveler and engageable in a seat on the plunger, and cooperating means on the tube and traveler for releasing the pins from their seat when the traveler is at the discharge end of the tube, so that the plunger may be projected into the spindle.

4. In combination with the live spindle of a machine tool, a feed tube arranged in axial continuation of the spindle, a piston movable in the tube, a stock-bar ejecting plunger operatively connected with the piston, a traveler slidable axially and angularly in the tube and embracing the forward end of the plunger, radial pins carried by the traveler and engageable in a peripheral groove in the plunger, and a nose member carried at the discharge end of the tube, the nose member having a bore and an interior recess surrounding the bore and defining a shoulder engageable with a shoulder on the traveler, whereby the traveler is arrested, the locking pins enter the recess and the plunger is projected into the spindle.

5. In combination with the live spindle of a machine tool, a feed tube in axial continuation of the spindle, a piston movable in the tube, a stock-bar ejecting plunger operatively connected with the piston and having a body portion adjacent the piston of substantially the same cross-sectional area as the latter, a traveler slidable axially and angularly in the tube and embracing the forward end of the plunger, locking means securing the traveler to the plunger, cooperating means on the traveler and the tube for releasing the former from the plunger when both are at the discharge end of the tube, a spacer limiting the movement of the body portion towards the traveler in the traveler-released position of the plunger, and means for admitting air under pressure between the body portion and traveler to impart reverse movement to the plunger.

6. In combination with the live spindle of a machine tool, a feed tube arranged in axial continuation of the spindle, a piston movable in the tube, a stock-bar ejecting plunger operatively connected with the piston and having a body portion adjacent the piston of substantially the same cross-sectional area as the latter, a traveler slidable axially and angularly in the tube and embracing the forward end of the plunger, locking means securing the traveler to the plunger, cooperating means on the tube and traveler for releasing the latter from the plunger when both are at the discharge end of the tube, and a sleeve loosely surrounding the plunger between the traveler and the body portion and abutting both in the traveler-released position of the plunger, the tube having an air-pressure inlet port in the region of the sleeve when the latter is in such abutting position.

JAMES H. McCOY.

REFERENCES CITED

The following references are of record in the file of this patent:

UNITED STATES PATENTS

| Number | Name | Date |
| --- | --- | --- |
| 324,409 | Nutting | Aug. 18, 1885 |
| 2,327,916 | Mariotte | Aug. 24, 1943 |
| 2,334,272 | Mariotte | Nov. 16, 1943 |
| 2,339,712 | Mariotte | Jan. 18, 1944 |